(12) United States Patent
Tongue et al.

(10) Patent No.: US 11,002,533 B1
(45) Date of Patent: May 11, 2021

(54) DYNAMIC FIBER OPTIC SHAPE SENSING

(71) Applicant: SENSURON LLC, Austin, TX (US)

(72) Inventors: Alex Tongue, Austin, TX (US); Justin Braun, Austin, TX (US)

(73) Assignee: THE SHAPE SENSING COMPANY INC., Austin, TX (US)

( * ) Notice: Subject to any disclaimer, the term of this patent is extended or adjusted under 35 U.S.C. 154(b) by 0 days.

(21) Appl. No.: 16/828,168

(22) Filed: Mar. 24, 2020

Related U.S. Application Data

(62) Division of application No. 16/296,489, filed on Mar. 8, 2019, now Pat. No. 10,663,290.

(51) Int. Cl.
| | |
|---|---|
| *G01B 11/24* | (2006.01) |
| *G01B 11/245* | (2006.01) |
| *G02B 6/02* | (2006.01) |
| *G01D 5/353* | (2006.01) |
| *G02B 6/04* | (2006.01) |

(52) U.S. Cl.
CPC ........ *G01B 11/245* (2013.01); *G01B 11/2441* (2013.01); *G01D 5/35316* (2013.01); *G02B 6/02076* (2013.01); *G02B 6/04* (2013.01)

(58) Field of Classification Search
CPC ....... G01B 11/24; G01B 11/25; G01B 11/306; G01B 11/245; G06T 7/0057
USPC ........................................................ 356/601
See application file for complete search history.

(56) References Cited

U.S. PATENT DOCUMENTS

| | | | |
|---|---|---|---|
| 7,772,541 B2 | 8/2010 | Froggatt et al. | |
| 7,781,724 B2 | 8/2010 | Childers et al. | |
| 7,813,599 B2 | 10/2010 | Moore | |
| 8,050,523 B2 | 1/2011 | Younge et al. | |
| 8,116,601 B2 | 2/2012 | Prisco | |
| 8,219,180 B2 | 7/2012 | Cao et al. | |
| 8,515,215 B2 | 8/2013 | Younge et al. | |
| 8,705,903 B2 | 4/2014 | Younge et al. | |
| 8,746,076 B2 | 6/2014 | Rogge et al. | |
| 8,773,650 B2 | 7/2014 | Froggatt et al. | |
| 8,780,339 B2 | 7/2014 | Udd | |
| 8,811,777 B2 | 8/2014 | Younge et al. | |
| 8,864,655 B2 | 10/2014 | Ramamurthy et al. | |
| 8,970,845 B1 | 3/2015 | Chan et al. | |
| 9,483,122 B2 | 1/2016 | Grass et al. | |
| 9,404,734 B2 | 8/2016 | Ramamurthy et al. | |
| 9,417,057 B2 | 8/2016 | T' Hooft et al. | |
| 9,494,416 B2 | 11/2016 | Duncan et al. | |
| 9,500,472 B2 | 11/2016 | Ramamurthy et al. | |
| 9,693,707 B2 | 7/2017 | Chan et al. | |
| 9,726,476 B2 | 8/2017 | Ramamurthy et al. | |
| 9,810,528 B2 | 11/2017 | Verstege et al. | |
| 2015/0289752 A1* | 10/2015 | Rachlin ............. | A61B 1/00114 600/572 |

* cited by examiner

*Primary Examiner* — Md M Rahman

(57) ABSTRACT

Disclosed herein are various implementations of a fiber optic shape-sensing system comprising a plurality of optical fibers helically twisted and rigidly bonded to form a linearly-running shape-sensing bundle for measuring position, bend, and twist of the shape-sensing bundle, wherein each optical fiber from among the plurality of optical fibers comprises a single core. Several such implementations of the systems further comprise an array of Fiber Bragg Gratings (FBGs) disposed within the core of each single-core optical fiber from among the plurality of single-core optical fibers.

20 Claims, 10 Drawing Sheets

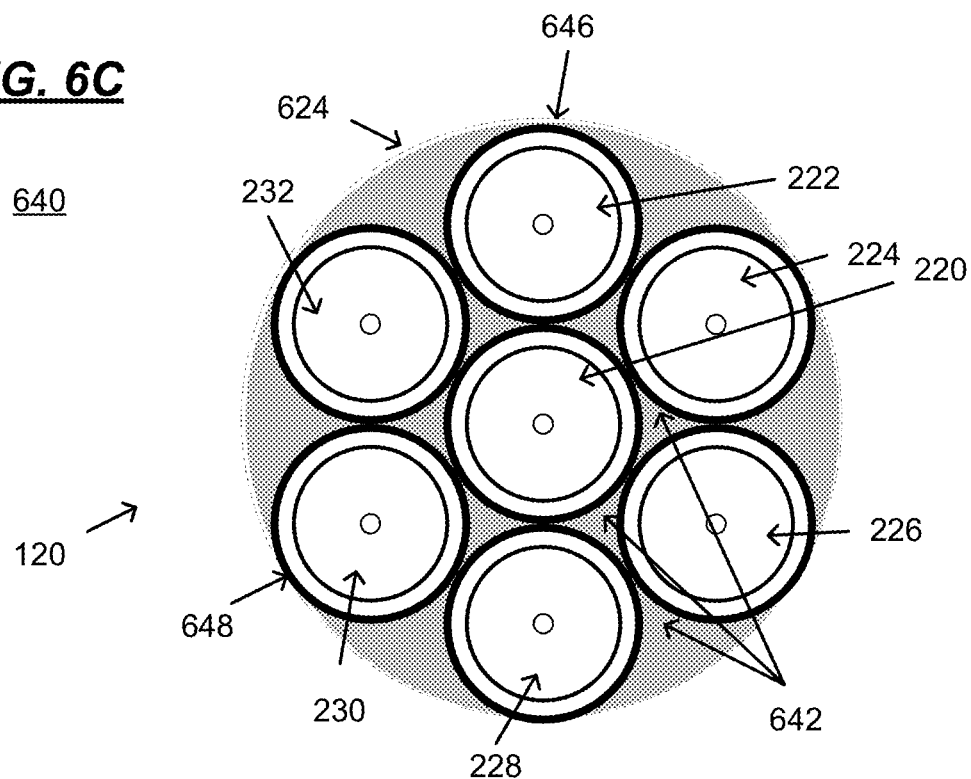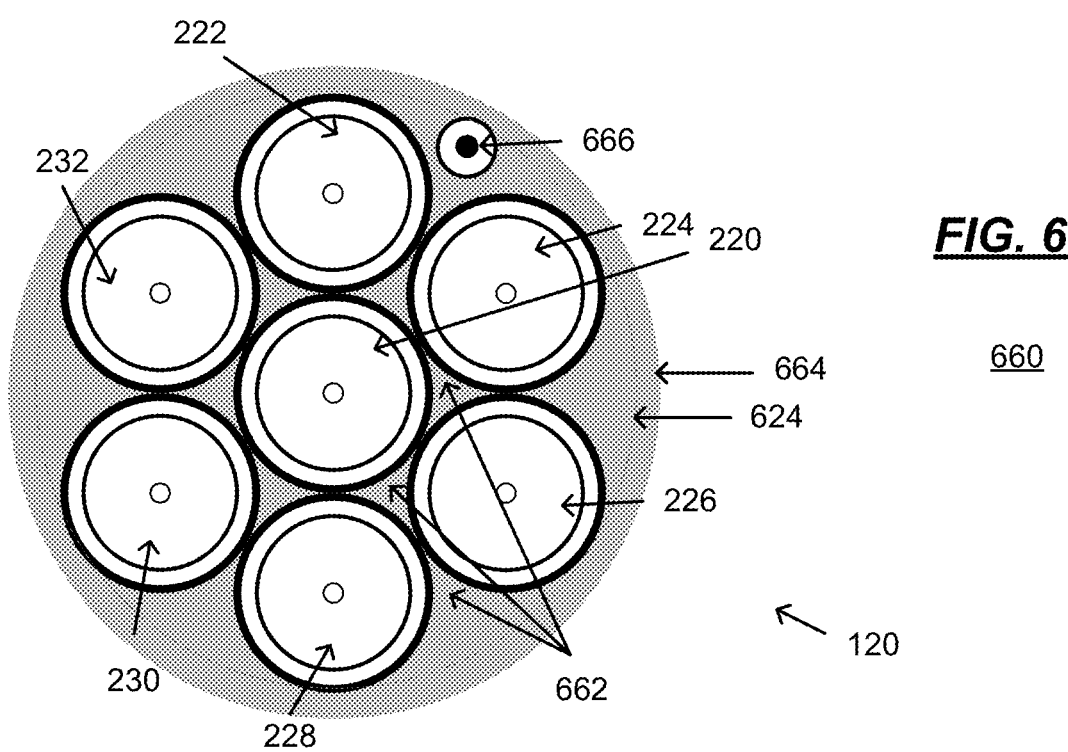

DYNAMIC FIBER OPTIC SHAPE SENSING

CROSS-REFERENCE TO RELATED APPLICATIONS

This application is a divisional of, claims benefit of and priority to, and incorporates herein by reference in its entirety U.S. patent application Ser. No. 16/296,489, filed Mar. 8, 2019, titled "DYNAMIC FIBER OPTIC SHAPE SENSING".

BACKGROUND

Fiber optic position and/or shape sensing devices generally comprise a multicore optical fiber (MOF) for determining position and shape of an object. The multicore optical fiber, in turn, typically comprises at least two cores positioned in a relative relationship to one another and spaced apart from each other to reduce mode coupling distortions between the fiber cores. Such devices further comprise an interrogator that transmits light to, and receives reflected light from, the MOF.

However, MOF shape-sensing devices have several shortcomings. First, a MOF can be relatively difficult to couple to an interrogator and require both the MOF and the interrogator to have specialized coupling components. Second, typical MOF exhibits minimal sensitivity to twist. Third, MOFs that feature Fiber Bragg Gratings (FBGs) have the FBGs on each core emplaced in the same relative location and aligned with each other—due to the process by which FBGs are incorporated into the multiple cores of such MOFs during their manufacture—and thus gaps between FBGs are also aligned and thereby define areas for which the MOF cannot monitor. Fourth, compared to single-core optical fibers, MOFs are substantially more expensive to manufacture and very costly to customize from the sole and ubiquitous MOF design universally available today (i.e., where producing any variation would be very expensive if even possible). Finally, most MOF-based sensing solutions utilize Wavelength Division Multiplexing (WDM) which limits the number of FBGs and, in turn, limits sensing precision.

SUMMARY

Disclosed herein are various implementations directed to systems, processes, methods, and other implementations for a fiber optic shape-sensing system comprising a plurality of optical fibers helically twisted and rigidly bonded to form a linearly-running shape-sensing bundle for measuring position, bend, and twist of the shape-sensing bundle, wherein each optical fiber from among the plurality of optical fibers comprises a single core; and an array of Fiber Bragg Gratings (FBGs) disposed within the core of each single-core optical fiber from among the plurality of single-core optical fibers. Several such implementations herein disclosed are further directed to fiber-optic shape-sensing system wherein the plurality of optical fibers comprises at least seven optical fibers with a first fiber running linearly and six other optical fibers encompassing the first fiber, and wherein the first optical fiber remains centrally-positioned with respect to the six other optical fibers, and wherein the six other fibers are helically twisted around the first optical fiber; wherein the plurality of optical fibers comprises at least three optical fibers that are helically twisted around each other to form triple-helix strand running linearly; further comprising an interrogator for transmitting light to, and receiving reflected light from, the shape-sensing bundle to produce interrogation data, wherein said interrogator is operationally coupled to said shape-sensing bundle; wherein the interrogator comprises an interface for operationally coupling the interrogator with the shape-sensing bundle comprising the plurality of optical fibers, the interface comprising a plurality of inputs each of which is capable of operationally coupling with an optical fiber comprising a single core; further comprising a computing system operationally coupled to the interrogator and capable of interpreting the interrogation data to determine position, bend, and twist of the shape-sensing bundle; wherein the interrogation data is processed using Optical Frequency Domain Reflectometry (OFDR) or Optical Time Domain Reflectometry (OTDR); wherein the shape-sensing bundle further comprises a free-floating temperature-detecting fiber; wherein the array of FBGs disposed within the core of each single-core optical fiber comprises a single elongated FBG running the entire length of a shape-sensing region of the shape-sensing bundle; wherein the array of FBGs disposed within the core of each single-core optical fiber from among the plurality of single-core optical fibers further comprises one reference reflector per fiber positioned in an operable relationship to each FBG in the array of FBGs for which an optical path length can be determined for each FBG in the array of FBGs; wherein at least a subset of FBGs from among the plurality of FBGs in at least one optical fiber from among the plurality of optical fibers overlaps a subset of gaps between FBGs from among the plurality of FBGs in at least one other optical fiber from among the plurality of optical fibers; and/or wherein at least a subset of FBGs from among the plurality of FBGs in each optical fiber from among the plurality of optical fibers overlaps a subset of gaps between FBGs from among the plurality of FBGs for each of the other optical fiber from among the plurality of optical fibers in the shape-sensing bundle.

Further disclosed herein are various alternative implementations directed to a device for sensing shape change in a target body when fixedly coupled to said target body, the device comprising a first optical fiber, a set of six additional optical fibers circumferentially encompassing the first optical fiber and helically twisted around said first optical fiber, and an adhesive (such as an adhesive epoxy, for example) for rigidly binding together the first optical fiber and the set of six additional optical fibers to form a multi-fiber bundle (MFB), wherein the first optical fiber and each optical fiber from among the set of six additional optical fibers comprise one core, a cladding surrounding each one core, a coating surrounding each one cladding, and at least one Fiber Bragg Grating (FBG) disposed within each one core. Several such implementations herein disclosed are further directed to a device for sensing shape change in a target body when fixedly coupled to said target body wherein the at least one FBG disposed within each one core of each single-core optical fiber comprises a single elongated FBG running the entire length of a shape-sensing region of the shape-sensing bundle; wherein the at least one FBG disposed within each of one core of each single-core optical fiber overlaps at least one gap between FBGs in at least one other optical fiber from among the at least one optical fibers; wherein the FBGs are capable of being interrogated using Optical Frequency Domain Reflectometry (OFDR) and/or Optical Time Domain Reflectometry (OTDR); and/or wherein the first optical fiber and each optical fiber from among the set of six additional optical fibers further comprise a second coating.

Also disclosed herein are various alternative implementations directed to device for interrogation-based shape-sensing, the device comprising a plurality of optical fibers helically twisted and rigidly bonded to form a linear shape-sensing bundle for measuring position, bend, and twist of the shape-sensing bundle, wherein each optical fiber from among the plurality of optical fibers comprises a single core, and wherein an array of Fiber Bragg Gratings (FBGs) are disposed within the core of each single-core optical fiber from among the plurality of single-core optical fibers, an interrogator for transmitting light to, and receiving reflected light from, the shape-sensing bundle to produce interrogation data, wherein said interrogator is operationally coupled to said shape-sensing bundle, and wherein said interrogator, wherein the interrogator comprises a plurality of inputs each of which is capable of operationally coupling with each of the plurality of optical fibers, and a computing system operationally coupled to the interrogator and capable of interpreting the interrogations data to determine position, bend, and twist of the MFB. Several such implementations herein disclosed are further directed to a device for interrogation-based shape-sensing wherein each optical fiber from among the plurality of optical fibers each comprising no more than one core; and/or wherein the interrogation data is processed using either Wavelength Division Multiplexing (WDM) or Optical Frequency Domain Reflectometry (OFDR) and/or Optical Time Domain Reflectometry (OTDR).

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description of illustrative implementations are better understood when read in conjunction with the appended drawings. For the purpose of illustrating the implementations, there is shown in the drawings example constructions of the implementations; however, the implementations are not limited to the specific methods and instrumentalities disclosed. In the drawings:

FIG. 6C illustrates a cross-section of a third helically-twisted multi-fiber bundle comprising the MFB of FIG. 1 and its plurality of single-core optical fibers but further comprising a third configuration of adhesive representative of various implementations disclosed herein;

FIG. 6D illustrates a cross-section of a fourth helically-twisted multi-fiber bundle comprising the MFB of FIG. 1 and its plurality of single-core optical fibers but further comprising a fourth configuration of adhesive representative of various implementations disclosed herein;

DETAILED DESCRIPTION

Figure 1:
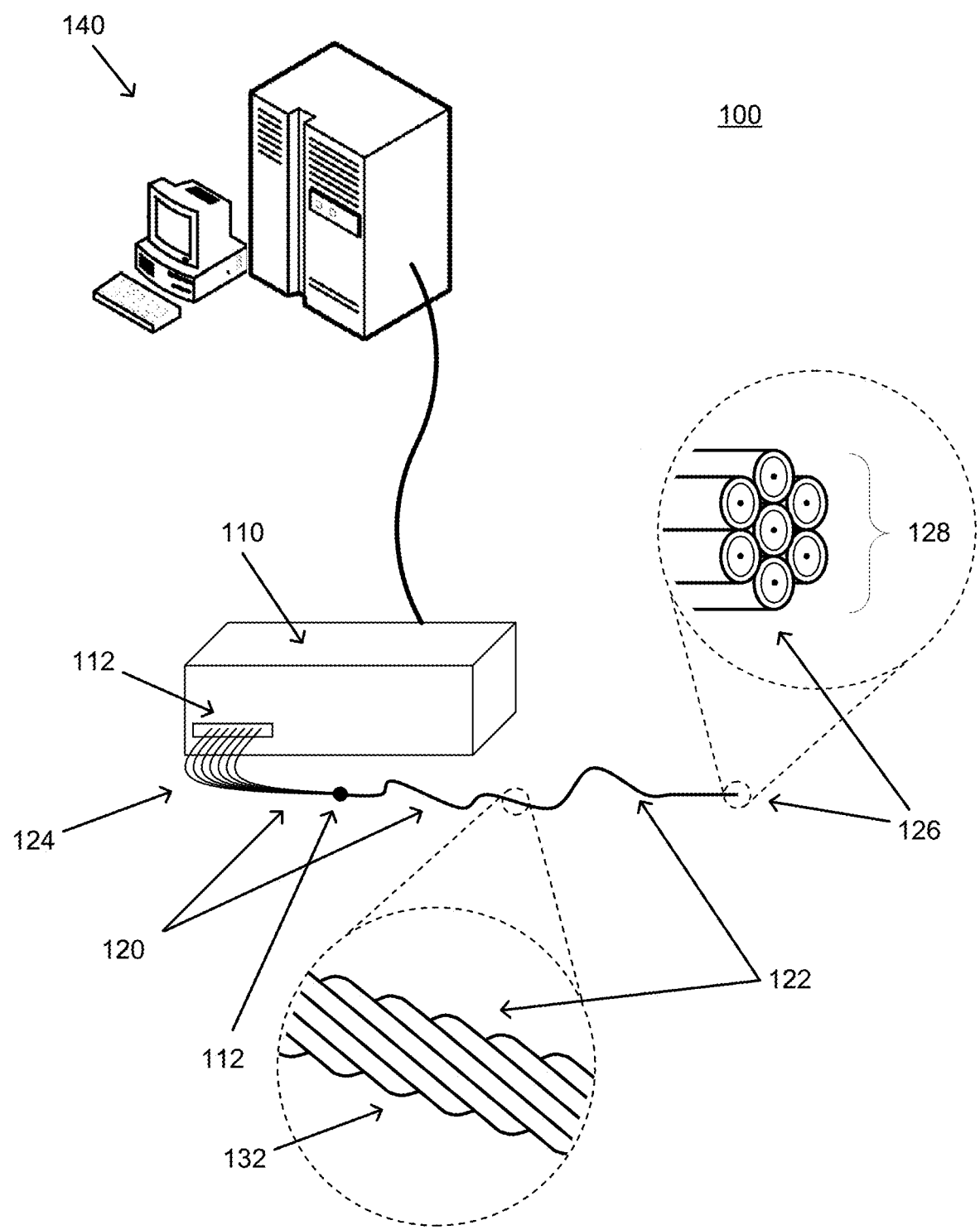
FIG. 1 illustrates an exemplary implementation of a shape sensing device representative of various implementations disclosed herein.

Structural devices and objects can undergo shape changes when exposed to certain environments or conditions, in which case it may be beneficial to know the degree of such shape changes in order to adapt to or compensate for such changes. For this purpose, a fiber optic sensor embedded in or attached to the structure may monitor the dynamic shape or relative position of the structure and, in certain instances, may do so without inaccuracies being introduced due to temperature or load effects. In a similar manner, the specific state of intentionally flexible structures may be determined at any point in time by measuring the dynamic shape of such structures at such time.

Fiber optic sensors utilize one or more fiber optic components to measure shape changes. Compared to other sensors, fiber optic sensors are particularly useful in smart structures, health monitoring, and other applications because of their relatively small size, low cost, multiplexing capabilities, immunity to electromagnetic interference and vibration, intrinsic safety, and ability to be embedded within or attached to many types of structures operating in a variety of different physical conditions.

An understanding of various concepts are helpful to a broader and more complete understanding of the various implementations disclosed herein, and skilled artisans will readily appreciate the implications these various concepts have on the breath and depth of the various implementations herein disclosed. Certain terms used herein may also be used interchangeably with other terms used herein and such terms should be given the broadest interpretation possible unless explicitly noted otherwise.

Fiber Optic Sensing

Fiber optic sensing enables precise measurement of full strain fields, load distributions, temperature distributions, and other parameters, and thus is becoming pervasive across multiple industries including manufacturing, mechanical, medical, automotive, aerospace, and energy.

For "intrinsic" fiber optic sensing—where the fiber optic cable itself is the sensor—changes in a light signal are measured as the signal moves down an optical fiber's waveguide. These optical sensors can measure temperature, strain, pressure, and other parameters by monitoring the resulting changes in the intensity, phase, polarization, wavelength, and/or transit time of light within the fiber. Sensors that vary the reflected wavelength of light based on strain or temperature within the fiber are the simplest to measure, as only one source and detector are required. These fiber optic sensors can also provide distributed sensing along the entire length of the fiber.

Fiber optic sensors of this kind typically use one of two techniques—based on natural "scattering" or based on use of "Fiber Bragg Gratings" (FBGs)—for analyzing the changes in the way the light reflects in the optical fiber's waveguide and interpreting this information to provide accurate measurements. However, each technique has advantages and disadvantages. For example, scattering techniques offer fully distributed data points along a fiber using naturally occurring random imperfections in the fiber optic cable, but this dependence on natural imperfections is limited as such imperfections are rarely optimal for such purposes. FBGs, on the other hand, can also be fully distributed but only by using a fiber having continuously inscribed FBGs which can be difficult and costly to produce. Nevertheless, because FBGs are purposefully fabricated as well-defined sensors—and thus are much more optimal than imperfections that occur naturally—FBGs have a much higher signal-to-noise ratio and are therefore much more reliable, which in turn enables FBG "interrogators" (the data acquisition hardware) to obtain precise measurements when using continuously inscribed FBGs. Specifically, FBGs use periodic perturbations in refractive index inscribed into the optical fiber to reflect only a specific wavelength of light (described further below), and strain and temperature changes cause spectral shifts in the reflected wavelength which are detectable by an interrogator. Stated differently, FBGs exhibit periodic variations in the fiber's index of refraction (the speed of light within the fiber) such that a single FBG consists of a finite length of fiber which contains these perturbations and the entire FBG acts as a wavelength selective mirror. As such, most fiber optic sensing systems on the market today use FBGs to reflect light back to an interrogator.

By operating as wavelength selective mirrors, FBGs reflect a single specific wavelength of light and transmit all others, and the wavelength reflected by the FBG is referred to as the "Bragg wavelength". When an FBG (and the optical fiber in which it is located) is stretched, compressed, and/or undergoes changes in temperature, the Bragg wavelength (i.e., the reflected wavelength) changes. The interrogator—using a demodulation technique—can observe this change in the wavelength and translate it into strain and temperature measurements based on the relationship between mechanical strain, temperature change, and the resulting Bragg wavelength. Notably, FBGs have inherent sensitivity to both mechanical strain and temperature change, so it is not just the thermal expansion (mechanical) which gives sensitivity to temperature, but also some optical properties change as well which have an affect on the Bragg wavelength. Notably, for various implementations herein described, it may be that each array of FBGs contained within a single fiber requires a single reference reflector located on a second fiber "arm" whereby the single fiber gets split into two fibers such that one of the two splits contains the array of FBGs and the other split arm contains a single reference reflector. This setup would then be copied for each array which must be interrogated (e.g., each individual sensing fiber contained in the 3D shape sensing bundle).

Both scattering and FBG technologies use various demodulation techniques—used to obtain and interpret the optical signal provided by the sensors—with Wavelength Division Multiplexing (WDM) being the most common for FBG-based optical sensors. However, Optical Frequency Domain Reflectometry (OFDR) offers significant advantages over WDM in many circumstances, primarily because OFDR technology can utilize an order-of-magnitude more sensors on a single fiber than Wavelength Division Multiplexing (WDM). Optical Time Domain Reflectometry (OTDR) may also provide advantages in certain circumstances.

In WDM systems each FBG must reflect a different Bragg wavelength. Because laser light comprises only a finite number of distinguishable wavelengths, WDM systems are limited to the number of sensors they can interrogate on a single fiber. Furthermore, in WDM the range of potentially reflected wavelengths for each FBG cannot be too close to those used by another FBG in the same optical fiber because one FBG under strain could shift so much as to reflect the same wavelength as another grating (strained or unstrained) and thereby render the data indistinguishable as to the FBG source (making the data unusable).

In contrast, in OFDR systems each FBG reflects the same wavelength where the return reflections are measured for changes in wavelength as a function of modulation frequency and that can be plotted as indicators of fiber length corresponding to the locations of each FBG (even among a continuous array of FBGs). In this manner, OFDR is able to provide spatially continuous information along one or more fibers (while WDM cannot), making OFDR well-suited for applications that require spatially continuous monitoring of strain, temperature, stress, distributed loads, or shape-changes in real-time. And because OFDR allows each FBG to reflect the same wavelength, there is no limit on the total number of FBG sensors incorporated into an optical fiber (enabling continuous arrays of FBGs) that are used to provide spatially continuous measurements along the optical fiber. Indeed, the measurement distance for such FBG sensors is only limited by the coherence length of the tunable light source.

Accordingly, one approach for achieving continuous measurements using an optical fiber (e.g., to collect fully distributed strain and temperature data) is to inscribe FBGs continuously along the entire length of the optical fiber. The FBGs must be incorporated into the core of the optical fiber when the optical fiber is manufactured or written through the coating post-manufacturing. The FBGs then act as miniscule mirrors in the core of the optical fiber. As a light-based signal travels down the optical fiber, each FBG reflects a portion of the signal back to the system. The system recognizes changes in the returning signal and interprets this information to provide accurate strain and temperature measurements. As such, when an FBG optical fiber is bonded to a material and interrogated with light, the FBGs will reflect different wavelengths as the fiber is strained concurrent with the material onto which it is bonded.

Multicore Optical Fiber

Fiber optic position and/or shape sensing devices generally comprise a multicore optical fiber for determining position and shape of an object. Multicore optical fiber comprises two or more cores within a common cladding, positioned in relative relationship to one another, and spaced apart from each other to reduce mode coupling (i.e., distortions) between the fiber cores. Such devices further comprise an interrogator that transmits light to, and receives reflected light from, the multicore optical fiber.

Certain fiber optic sensors for three-dimensional position determinations may comprise a flexible "smart cable" which measures local curvature and torsion along the length of the cable. These measurements can then be used to infer the position and attitude of one end of the cable relative to the other because measurements of the local curvature and torsion along the cable allow reconstruction of the entire cable shape (including the relative position and orientation of the end points). The smart cable for making these measurements comprises a multicore optical fiber where individual fiber cores are constructed to operate in the single mode regime and positioned close enough to generate mode coupling (cross-talk) between the cores over the length of the fiber and which is sensitive to the distribution of strain along the cable (in terms of curvature and torsion). This approach, however, is prone to three classes of errors—instrument noise, fabrication defects, and sensitivity to extrinsic variables (e.g., temperature)—with instrument noise being the most significant source of error and typically mitigated by using fibers with redundant cores.

Other fiber optic sensors may utilize a multicore optical fiber comprising two or more core regions arranged within a single cladding region, each core region comprising a substantially transparent core material and having a core refractive index, a core length, and a core diameter. The cladding region comprises a length of first substantially transparent cladding material having a first refractive index and, in turn, the first substantially transparent cladding material has an array of lengths of a second cladding material embedded along its length where the second cladding material has a second refractive index less than the first refractive index such that radiation input to the fiber propagates along at least one of the core regions. The cladding region and the core regions may be arranged such that radiation input to the optical fiber propagates along one or more of the lengths of the core regions in a single mode of propagation. If the optical fiber is a multicore photonic crystal fiber (MPCF), it may be used as a bend sensor where a measurement of the relative shift in a fringe pattern provides an indication of the extent by which the MPCF is bent and, when the fiber is embedded in a structure, an indication of the extent to which the structure is bent. However, because this approach measures intensity through the relative shift in the fringe pattern (and the corresponding loss of light), the system is not as accurate as an internal reflection system where all light is preserved by its internal reflection capability.

To detect bending and deformation in all directions (three-dimensionally), multicore-based devices may use either a multicore fiber comprising two cores that are twisted through 90-degrees or use a multicore fiber comprising three or more cores in which the cores are not disposed in the same plane. Measuring of the amount of bend may be determined by measuring the interference pattern from the superimposed beams of the output from the cores or by measuring the intensity of each of the output beams. When there is no appreciable cross-coupling between the cores, an interferometric means for measurement may include a light receiving surface which is arranged in the path of light which passes through the two cores and has been brought into interference by means of superimposition. To superimpose the light beams emitted from each of the cores, a beam divider device or devices may be utilized. Moreover, the sensing means may use a light receiving surface as a collecting screen in which the interference pattern can be directly observed, or the light receiving surface may be the light sensitive surface of a light sensitive detector which monitors the light intensity of the interference pattern.

However, multicore-based devices using multi-core optical fibers (MOF) have several shortcomings that significantly limit their utilization in many real-world applications. First, a MOF can be relatively difficult to couple to an interrogator and require both the MOF and the interrogator to have specialized coupling components. Second, typical MOF exhibits minimal sensitivity to twist. Third, MOFs that feature Fiber Bragg Gratings (FBGs) have the FBGs on each core emplaced in the same relative location and aligned with each other—due to the process by which FBGs are incorporated into the multiple cores of such MOFs during their manufacture—and thus gaps between FBGs are also aligned and thereby define areas for which the MOF cannot monitor. Fourth, compared to single-fiber optical fibers, MOFs are substantially more expensive to manufacture. Finally, most MOF-based sensing solutions utilize Wavelength Division Multiplexing (WDM) which limits the number of FBGs and, in turn, limits sensing precision.

Helically Twisted Bundle of Single-Core Optical Fibers

Various implementations disclosed herein are directed to a fiber optic sensing device that comprises a plurality of single-core optical fibers wound together, with a subset of the single-core optical fibers in a helical twist, and the bundle rigidly bonded with an adhesive to form a single multi-fiber bundle ("rigidly" meaning where all fibers in the multi-fiber bundle deform together due to a change in position or shape). In this configuration—and because each fiber has its own core, cladding, and coating—the fiber cores are spaced apart and separated from each other such that mode coupling between the fiber cores is substantially eliminated. An interrogator may be coupled to each individual optical fiber in order to obtain data associated with each of the multiple fiber segments of each individual optical fiber and, collectively, all of the fiber segments of all of the optical fibers. This data, in turn, can then be used to determine a strain parameter for the core of each of the multiple fiber segments and, based on predetermined baseline strain parameters for each fiber in the multi-fiber bundle, information regarding shape (including position and bend as well as twist) of a portion of the multi-fiber may also be determined. These determinations, in turn, enable the strain parameters to be converted into local shape measurements defining shape in the multi-fiber bundle at a particular location along the bundle that represent a change in position, bend, or twist. A particular side effect and enhanced benefit to the multi fiber bundle is that the center core can be used to get a larger twist signal in a different way compared to the traditional straightforward approaches (such as those based on MOF designs).

FIG. 1 illustrates an exemplary implementation of a shape sensing device (SSD) 100 representative of various implementations disclosed herein. In FIG. 1, the shape sensing device 100 comprises a multi-fiber bundle (MFB) 120 operationally coupled to an interrogator 110 (or "reflectometer") via an integrated connection interface (ICI) 112. In a general sense, the interrogator 110 may comprise a laser and an optical network. The interrogator 110 may also comprise an Optical Frequency Domain Reflectometer (OFDR), an Optical Time Domain Reflectometer (OTDR), or both (among other options such as those based on Wavelength Division Multiplexing (WDM) for example), and/or any other device suitable for processing light signals received from the MFB 120 to produce interrogation data with regard to shape sensing as known and appreciated by skilled artisans. The interrogator 110, in turn, may be operationally coupled to a special-purpose computing system 140 capable of interpreting the interrogations data to determine position, bend, and twist of the MFB and/or presenting this information to an end-user for any of a variety of different purposes known and appreciated by skilled artisans.

With specific regard to the interrogator 110, optical transduction may be utilized that involves monitoring the reflected FBG wavelength and correlating that information to either strain or temperature or both, and where the sensitivity of the Bragg wavelength to strain and temperature is derived independently. Changes in the FBG length and optical properties due to changes in strain or temperature result in changes to the Bragg wavelength of the FBG. In this manner, mechanical strain and temperature can be measured directly—based on changes to the Bragg wavelength of the FBG—and various temperature compensation techniques can then be employed to decouple these measurements.

In FIG. 1, MFB 120 further comprises a helically-twisted 132 main section 122 for shape sensing (including detecting shape, position, bend, and twist), an interrogator-side unbonded section 124 for coupling to the integrated connection interface 112, and a terminal portion 126 constituting the terminus of the main section 122 and the MFB 120 opposite the unbonded section 124. The MFB may also comprise optional boundary reinforcement 112 at the boundary between the helically-twisted 132 main section 122 and the unbonded section 124. As shown in FIG. 1, the main section 122 may comprise a plurality of single-core optical fibers 128, and this plurality of optical fibers 128 may be rigidly bonded such that all fibers in the MFB 120 deform together due to a change in position, shape, bend or twist of the MFB 120.

Zooming in on the terminus 126 illustrated in FIG. 1, the helical MFB 120 further comprises a plurality of single-core optical fibers 128. For example, as shown in FIG. 1, the MFB 120 may comprise a set of seven (7) single-core optical fibers 128 and these single-core optical fibers 128 may be arranged such that, from the boundary between the rigidly bonded helically-twisted main section 122 and the unbonded section 124 to the terminal portion 126, one fiber runs linearly through the center of the MFB 120 while the remaining six fibers are helically twisted 132 around and bonded to the center fiber.

Figure 2A:
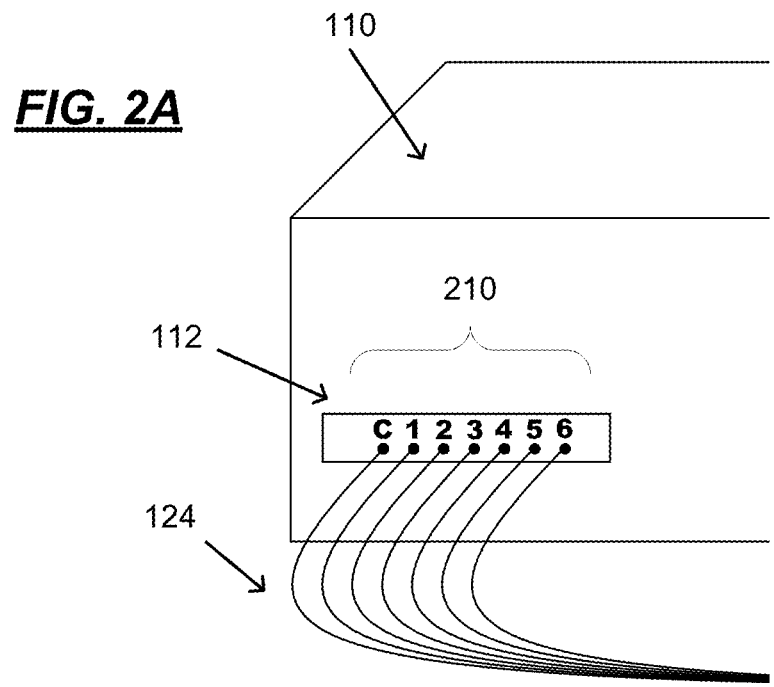
FIG. 2A illustrates the exemplary integrated connection interface (ICI) of the interrogator shown in FIG. 1 representative of various implementations disclosed herein.

FIG. 2A illustrates the exemplary integrated connection interface (ICI) 112 of the interrogator 110 shown in FIG. 1 representative of various implementations disclosed herein. In FIG. 2A, the ICI 112 comprises a plurality of optical fiber engagement points 210 where each point is capable of operationally coupling with the core of a single-core optical fiber. Each engagement point 210 may be designated for a specific single-core optical fiber from unbonded section 124 of the MFB 120, and may also be designated or labeled accordingly such that, for example, the engagement point for the central-running optical fiber might be labeled as "C" while the six other points corresponding to the other six optical fibers helically twisted and surrounding the central-running optical fiber may be numbered, by way of example, in a clockwise fashion as "1", "2", "3", "4", "5", and "6" accordingly (in reference to the MFB 120 illustrated in FIG. 2B and described below). Moreover, the ICI 112 may further comprise an additional engagement point (not shown) for interfacing with an additional single-core optical fiber or other sensor for temperature determinations along the MFB 120 or for other purposes (described later herein).

Figure 2B:
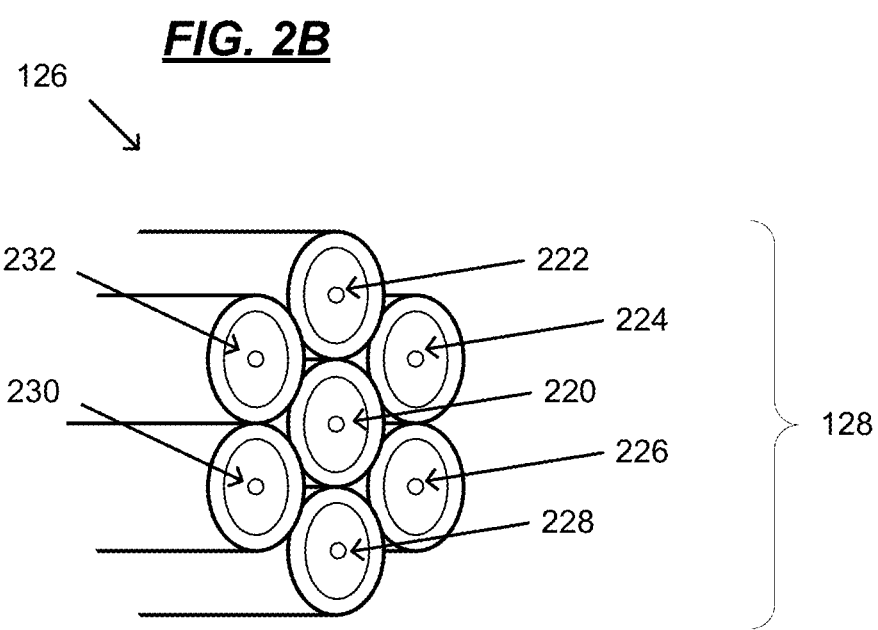
FIG. 2B illustrates the terminal portion of the main section of the multi-fiber bundle (MFB) providing a cross-section of the MFB representative of various implementations disclosed herein.

FIG. 2B illustrates the terminal portion 126 of the main section 122 of the MFB 120 providing a cross-section of the MFB 120 representative of various implementations disclosed herein. In FIG. 2B, the MFB 120 comprises a plurality of optical fibers 128 which are shown to be seven (7) single-core optical fibers including one (1) central optical fiber 220 running linearly through the MFB 122 and enclosed within the other six (6) additional optical fibers 222, 224, 226, 228, 230, and 232, the latter of which (as shown in FIG. 1) are helically twisted 132 around the central-running optical fiber 220.

Figure 3A:
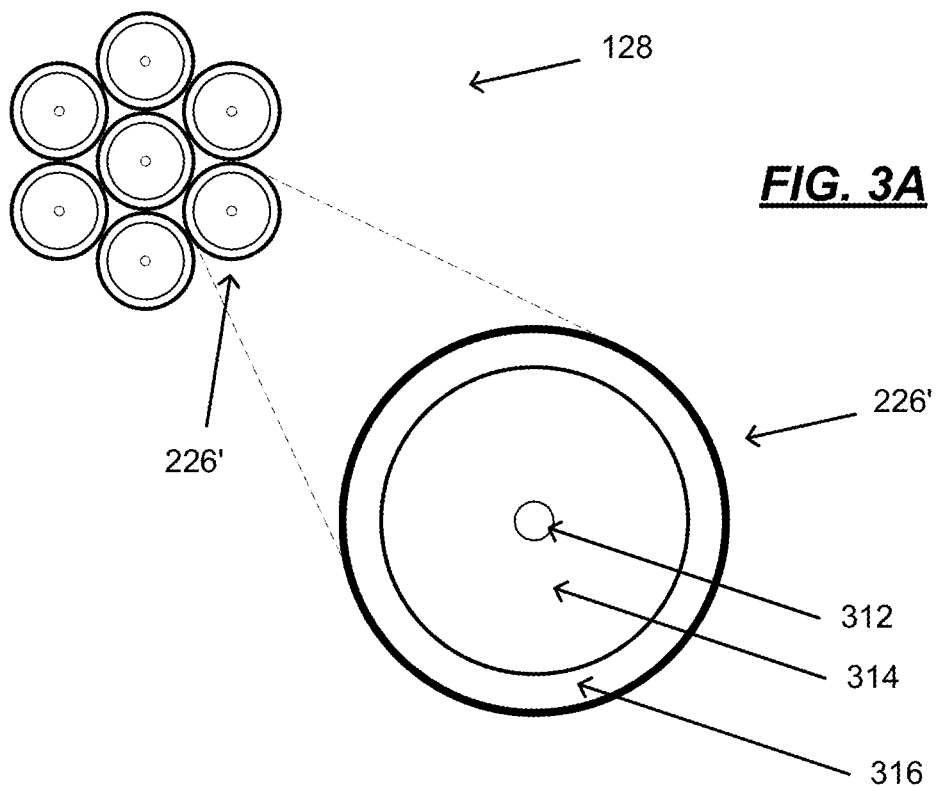
FIG. 3A illustrates the composition of an exemplary single-core optical fiber from among the plurality of optical fibers comprising the main section of the of the MFB representative of various implementations disclosed herein.

FIG. 3A illustrates the composition of an exemplary single-core optical fiber 226' from among the plurality of optical fibers 128 comprising the main section 122 of the MFB 120 representative of various implementations disclosed herein. In FIG. 3A, the single-core optical fiber 226' comprises a core 312, cladding 314, and a coating 316. The core and cladding may be both made from silica glass, although the optical properties of each differ. Specifically, the refractive index of the core—which describes the speed at which light travels through a material—is slightly increased during the manufacturing process in order to form the waveguide that enables light to be transmitted over long distances in the core with very low attenuation. The outermost layer, the coating, is applied to the outside of the cladding to increase the robustness of the fiber while protecting the exterior of the cladding from mechanical damage and contaminants, such as dirt and moisture. For strain sensing applications, this coating must be sufficiently stiff in order to provide a load path for strain to transfer into the core. These three primary layers of the optical fiber structure are depicted in FIG. 3A. For additional environmental protection, fiber is often encased within auxiliary buffer tubes or jackets to form a fiber optic cable, otherwise known as a "patch cord". In a typical patch cord, the optical fiber is packaged in a tight buffer jacket and loosely incorporated into an outer jacket filled with strength members such as Kevlar® strands.

Figure 3B:
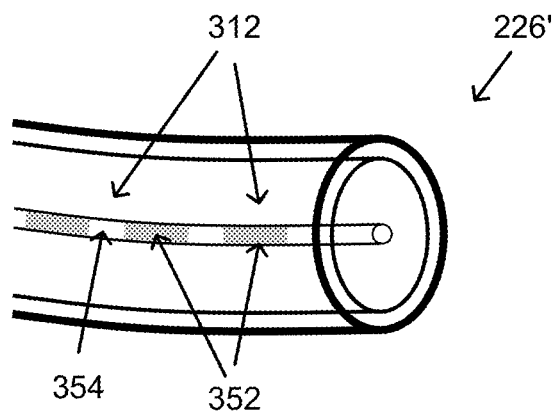
FIG. 3B further illustrates the composition of an exemplary single-core optical fiber from among the plurality of optical fibers comprising the main section of the of the MFB representative of various implementations disclosed herein.

FIG. 3B further illustrates the composition of an exemplary single-core optical fiber 226' from among the plurality of optical fibers 128 comprising the main section 122 of the MFB 120 representative of various implementations disclosed herein. In FIG. 3B, the core 312 of the exemplary single-core optical fiber 226' further comprises a plurality of Fiber Bragg Gratings (FBGs) 352 separated by a plurality of inter-FBG gaps 354. An FBG is a sensor that may be inscribed into the core of the optical fiber by periodically modulating the refractive index of the core to create a series of such modulations to create a grating structure, whereby each FBG being composed of thousands of such modulations in a continuous sequence. The resulting grating structure acts as a wavelength selective mirror for light propagating through the fiber such that most wavelengths of light will travel through the grating uninterrupted while constructive interference occurs at one specific wavelength causing the light at that wavelength to be partially reflected back down the fiber. The reflected FBG wavelength can then be used to determine strain or temperature at that location along the fiber because the Bragg wavelength will vary depending on mechanical strain and temperature occurring at the FBG.

FBGs provide certain advantages in utilization with the various implementations disclosed herein. However, alternative implementations instead utilizing Optical Frequency Domain Reflectometry (OFDR), Optical Time Domain Reflectometry (OTDR), Wavelength Division Multiplexing (WDM), or utilizing Rayleigh or other scattering (that is, without FBGs) are also anticipated variations encompassed by the various implementations described herein without limit.

Figure 4A:
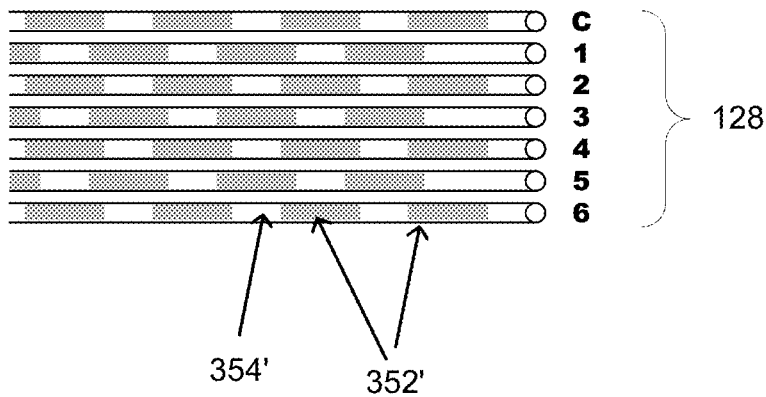
FIG. 4A represents an arrangement of gap-overlapping FBGs corresponding to the plurality of optical fibers comprising an MFB representative of various implementations disclosed herein.

FIG. 4A represents an arrangement of gap-overlapping FBGs corresponding to the plurality of optical fibers 128 comprising an MFB 120 representative of various implementations disclosed herein. In FIG. 4A, each single-core optical fiber (labeled C, 1, 2, 3, 4, 5, and 6) comprising a plurality of FBGs such that the central fiber (C) and the three even-numbered helical fibers (2, 4, and 6) have fully overlapping FBGs that also fully overlap the gaps of the odd-numbered helical fibers (1, 3, and 5), and vice versa, such that the gaps between FBGs in any optical fiber have at least three FBGs in other fibers overlapping said gaps. Notably, odd-numbered fibers (1, 3, and 5) are arranged in a triangular orientation for three-dimensional sensing, as so are the even numbered fibers (2, 4, and 6).

Figure 4B:
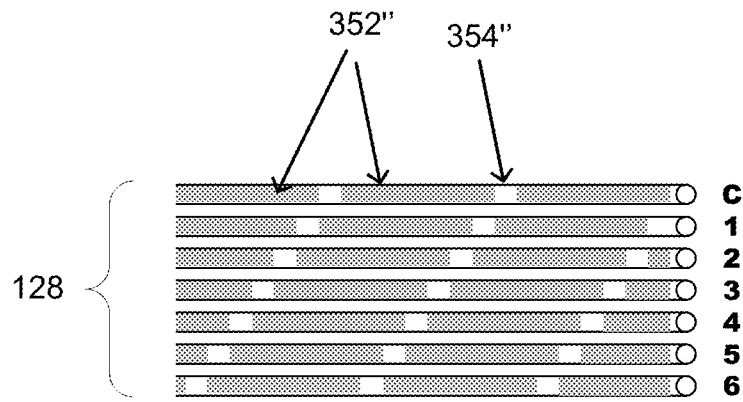
FIG. 4B represents an arrangement of highly-prolific gap-overlapping FBGs corresponding to an unwrapped view of the plurality of optical fibers comprising an MFB representative of various implementations disclosed herein.

FIG. 4B represents an arrangement of highly-prolific gap-overlapping FBGs corresponding to an unwrapped view of the plurality of optical fibers 128 comprising an MFB 120 representative of various implementations disclosed herein. In FIG. 4B, each single-core optical fiber (labeled C, 1, 2, 3, 4, 5, and 6) comprising a plurality of long FBGs 352" and relatively short gaps 354" such that every gap in each of the single-core optical fibers (labeled C, 1, 2, 3, 4, 5, and 6) are fully overlapped by FBGs in the other fibers, and vice versa, such that the gaps between FBGs in any optical fiber has six (6) FBGs in the other fibers overlapping said gaps.

Figure 5A:
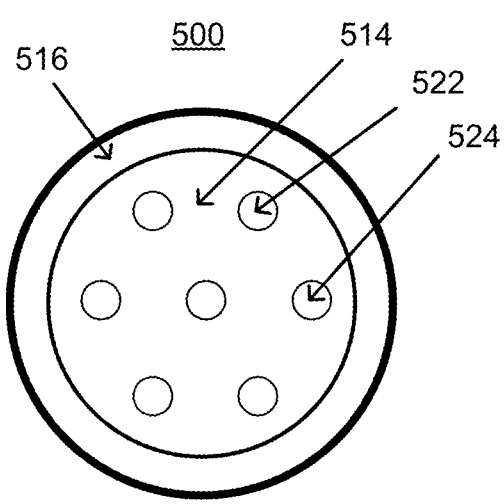
FIG. 5A illustrates a prior art multicore optical fiber (MOF) which lacks the gap-overlapping FBG feature of the various implementations represented by FIGS. 4A and 4B.
Figure 5B:
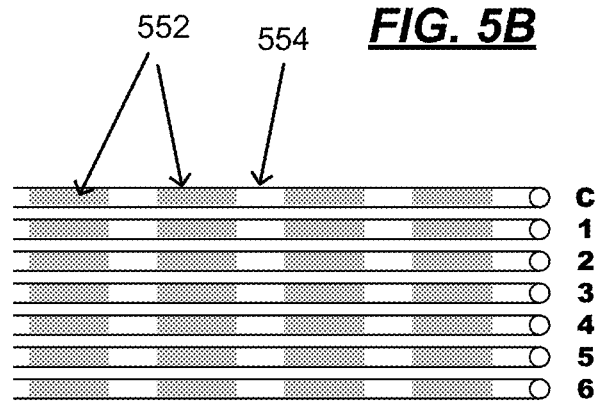
FIG. 5B represents an unwrapped view of the plurality of optical fibers comprising the prior art MOF of FIG. 5A but lacking the gap-overlapping feature of the various implementations represented by FIGS. 4A and 4B.

In contrast, FIG. 5A (together with FIG. 5B) illustrates a prior art multicore optical fiber (MOF) 500 which lacks the gap-overlapping FBG feature of the various implementations represented by FIGS. 4A and 4B, and FIG. 5B represents an unwrapped view of the plurality of optical fibers comprising the prior art MOF of FIG. 5A but lacking the gap-overlapping feature of the various implementations represented by FIGS. 4A and 4B.

As shown in FIG. 5A, the MOF 500 comprises a plurality of cores (e.g., cores 522 and 524) encompassed in a common cladding 514 which, in turn, is covered with an exterior coating 516. Each of the plurality of cores also comprises a series of FBGs (not shown).

In FIG. 5B, each core (labeled C, 1, 2, 3, 4, 5, and 6) of the MOF 500 comprises a plurality of FBGs 552 and inter-FBG gaps 554. As illustrated, the gaps 554 fully overlap each other, which is typical of MOF (a limitation of manufacturing MOF), and thus no sensing occurs in the MOF 500 at the locations corresponding to each set of gaps.

With regard to all of the implementations disclosed herein and represented by FIGS. 1-4B, it should be noted that several alternative implementations disclosed herein may instead utilize a plurality of typical MOF (such as the MOF shown in FIG. 5A, or any other MOF having a plurality of cores) in lieu of the plurality of single-core optical fibers in the MFB 120 for any such implementations disclosed herein. For example, with regard to FIG. 1, the plurality of helically-twisted single-core optical fibers 128 might instead be replaced with a plurality of helically twisted MOF in the MFB 120 with appropriate adaptations being made to, e.g., the ICI 112 of the interrogator 110 and so forth as will be appreciated by skilled artisans. Additionally, it can be appreciated that the present concepts further include combinations of one or more single-core optical fibers with one or more MOF.

Nevertheless, for the various implementations herein disclosed specifically utilizing a plurality of single-core optical fibers, there are several advantages over implementations that might instead use a plurality of MOF, or the use of a single MOF for that matter. Accordingly, for any of the implementations disclosed herein that utilize single-core optical fibers, various alternative implementations are also disclosed that utilize multi-core optical fibers in place of single-core optical fibers accordingly.

Returning now to descriptions of the multi-fiber bundle (MFB), various implementations disclosed herein are directed to bonding configurations in which the bundle is rigidly bonded with an adhesive to form a single multi-fiber bundle ("rigidly" meaning where all fibers in the multi-fiber bundle deform together due to a change in position or shape).

Figure 6A:
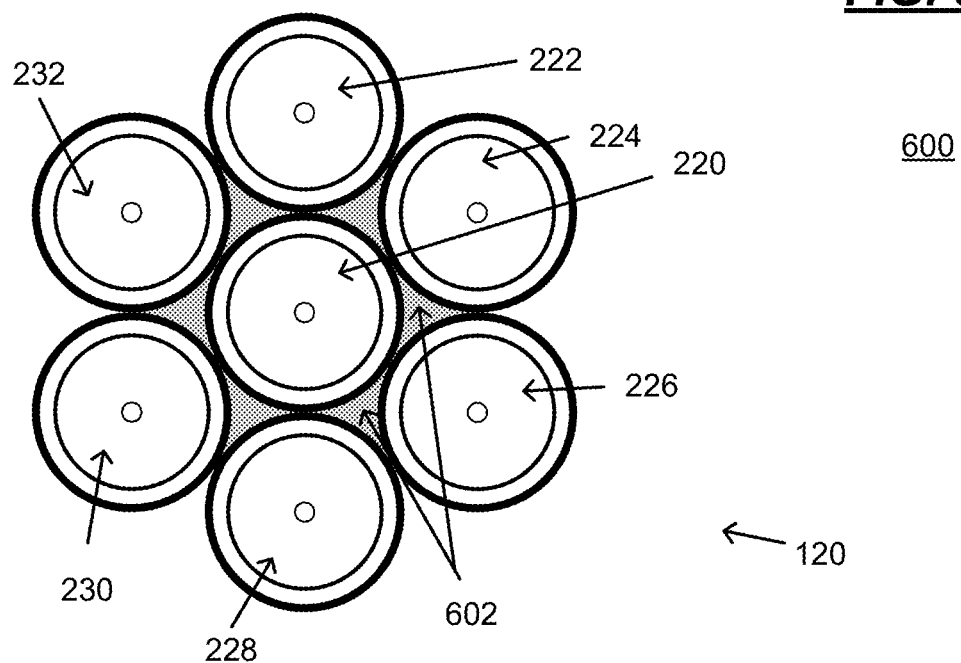
FIG. 6A illustrates a cross-section of a first helically-twisted multi-fiber bundle comprising the MFB of FIG. 1 and its plurality of single-core optical fibers but further comprising a first configuration of adhesive representative of various implementations disclosed herein.

FIG. 6A illustrates a cross-section of a first helically-twisted multi-fiber bundle 600 comprising the MFB 120 of FIG. 1 and its plurality of single-core optical fibers 220, 222, 224, 226, 228, 230, and 232 but further comprising a first configuration of adhesive 602, combination of adhesives, or other suitable material(s) (collectively referred to herein simply as "adhesives"), all of which are representative of various implementations disclosed herein. In FIG. 6A, the adhesive 602 is entirely confined to the interior of the bundle, surrounding the linearly-running central optical fiber 220 and engaging each of the helically twisted optical fibers 222, 224, 226, 228, 230, and 232 (and each other) but only within the spaces interior to the MFB 600 as shown. In this manner, the adhesive 602 is not substantially visible from the exterior of the bundle except at an end of the main section 122, e.g., at the terminal portion 126 of the MFB, and possibly at the boundary between the main section 122 and the unbonded section 124 as shown in FIG. 1.

Figure 6B:
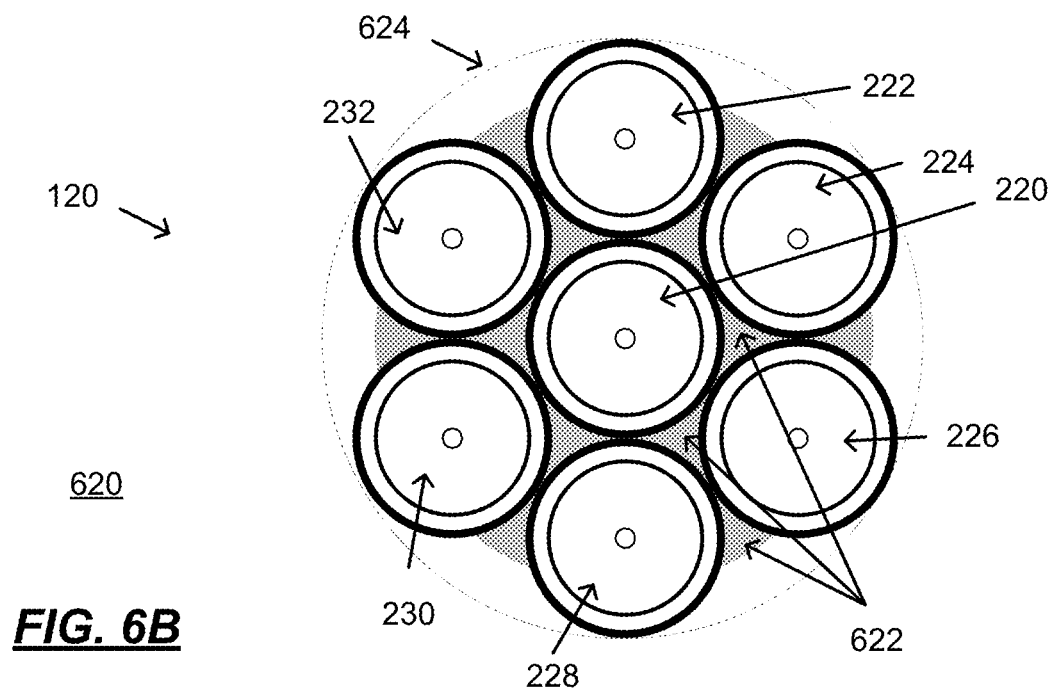
FIG. 6B illustrates a cross-section of a second helically-twisted multi-fiber bundle comprising the MFB of FIG. 1 and its plurality of single-core optical fibers but further comprising a second configuration of adhesive representative of various implementations disclosed herein.

FIG. 6B illustrates a cross-section of a second helically-twisted multi-fiber bundle 620 comprising the MFB 120 of FIG. 1 and its plurality of single-core optical fibers 220, 222, 224, 226, 228, 230, and 232 but further comprising a second configuration of adhesive 622 representative of various implementations disclosed herein. In FIG. 6B, the adhesive 622 extends beyond the interior of the bundle, surrounding the linearly-running central optical fiber 220 and engaging each of the helically twisted optical fibers 222, 224, 226, 228, 230, and 232 (and each other) both within the spaces interior to the MFB 620 and beyond the points the helically twisted optical fibers 222, 224, 226, 228, 230, and 232 engage or contact each other but not so as to entirely encompass these fibers or to extend beyond the radius 624 of the outmost exterior surface created by these fibers as indicated by the dashed line 624 in FIG. 6B. In this manner, the adhesive 602 is visible from the exterior of the bundle along with the helically twisted optical fibers 222, 224, 226, 228, 230, and 232.

FIG. 6C illustrates a cross-section of a third helically-twisted multi-fiber bundle 640 comprising the MFB 120 of FIG. 1 and its plurality of single-core optical fibers 220, 222, 224, 226, 228, 230, and 232 but further comprising a third configuration of adhesive 642 representative of various implementations disclosed herein. In FIG. 6C, the adhesive 642 extends beyond the interior of the bundle, surrounding both the linearly-running central optical fiber 220 and the helically twisted optical fibers 222, 224, 226, 228, 230, and 232 but within the radius 624 of the outmost exterior surface created by the exterior fibers as indicated by the dashed line in FIG. 6C as shown. In this manner, the adhesive 642 comprises most (if not all) of the visible exterior of the bundle except to the extent that the radially outermost portions of the helically twisted optical fibers 222, 224, 226, 228, 230, and 232 might also remain visible at, for example, visibility points 646 and 648 where the adhesive 642 is thinnest at the points where the helically twisted optical fibers 222, 224, 226, 228, 230, and 232 extend to the radius 624 as shown in the figure. Notably this third configuration of adhesive 642 provides the bundle 640 with a relatively smooth exterior surface and substantially obscures visibility of the helical twist.

FIG. 6D illustrates a cross-section of a fourth helically-twisted multi-fiber bundle 660 comprising the MFB 120 of FIG. 1 and its plurality of single-core optical fibers 220, 222, 224, 226, 228, 230, and 232 but further comprising a fourth configuration of adhesive 662 representative of various implementations disclosed herein. In FIG. 6D, the adhesive 662 extends beyond (as exterior surface 664) the radius 624 of the outmost exterior surface created by the exterior fibers 222, 224, 226, 228, 230, and 232 as indicated by the dashed line in the figure as shown. In this manner, the adhesive 662 comprises the entire visible exterior of the bundle (as exterior surface 664) as shown in the figure. Notably this fourth configuration of adhesive 662 provides the bundle 660 with a relatively smooth exterior surface and obscures visibility of the helical twist, providing a measure of additional protection to the helical fibers, as well as additional room for the inclusion of other component features. For example, a free-floating temperature-detecting fiber 666—known and appreciated by skilled artisans—might be incorporated into the adhesive 662 to provide temperature measurements unaffected by bending and twisting of the MFB 120. For certain implementations, this free-floating temperature-detecting fiber 666 may be (a) an additional optical fiber having its own core, cladding, and coating (akin to optical fibers 220, 222, 224, 226, 228, 230, and 232 but free-floating unlike these other optical fibers), (b) a different type of fiber suitable (i.e., different from the optical fibers) for temperature detection that does not need to be free-floating and instead could be fixably integrated into the adhesive 662, or (c) a different type of fiber (i.e., different from the optical fibers) suitable for temperature detection that is free-floating within the adhesive 662 as shown in the figure. The temperature sensing fiber may be a standard fiber with coating, cladding, and core and be free floating outside of the MFB or it can be free floating within a channel in the adhesive (i.e., embedded but still free floating). While the addition of other components is also possible in the second and third configurations of FIG. 6B and FIG. 6C, respectively, the fourth configuration of FIG. 6D may better accommodate larger components than the other configurations, especially when said additional components are to be fully encapsulated within the adhesive.

Various implementations disclosed herein are also directed to different configurations of helically-twisted single-core optical fibers in a bundle for sensing purposes.

Figure 7:
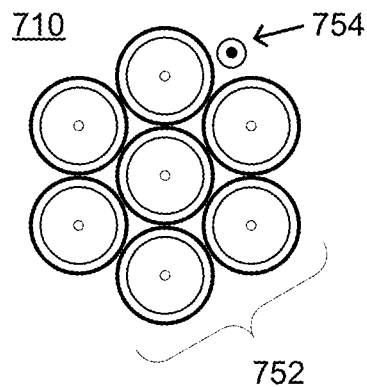
FIG. 7 illustrates a plurality of different configurations for helically-twisted single-core optical fiber bundles representative of various implementations disclosed herein.
Figure 7:
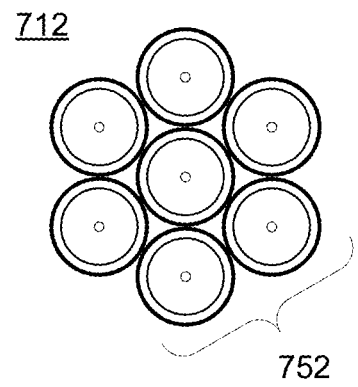
Figure 7:
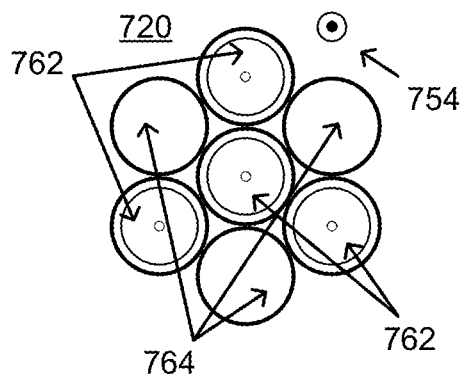
Figure 7:
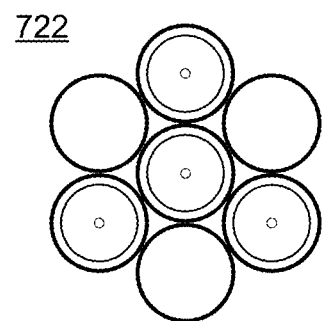
Figure 7:
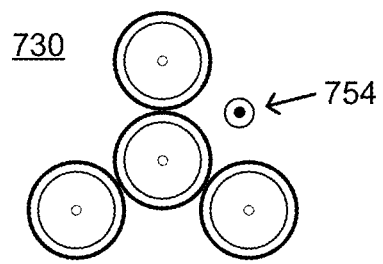
Figure 7:
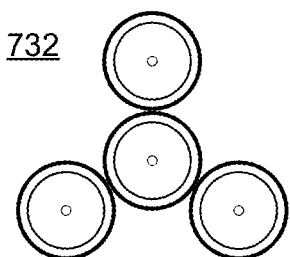
Figure 7:
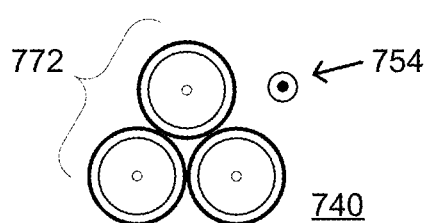
Figure 7:
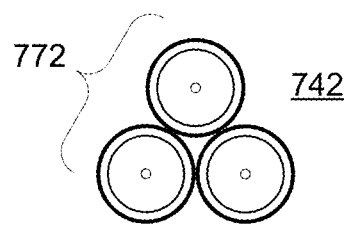

FIG. 7 illustrates a plurality of different configurations for helically-twisted single-core optical fiber bundles representative of various implementations disclosed herein. In FIG. 7, a first configuration 710 ("7/7+T bundle") comprises seven (7) helically-twisted single-core optical fibers 752 in the arrangement shown, including one linearly-running central fiber encompassed by six helically-twisted fibers, plus a free-floating temperature-detecting fiber 754. Relative to the other seven configurations shown in this FIG. 7, this first configuration 710 is most bulky but generally provides the most robust position, shape, bend and twist detection by measuring the stretch and compression of the single-core optical fibers 752 and separately measuring temperature without the effects of stretch and compression because the temperature-detecting fiber 754 is free-floating and thus does not stretch or compress when the bundle undergoes shape changes.

A second configuration 712 ("7/7 bundle") comprises seven (7) optical fibers 752 in the arrangement shown, including one linearly-running central fiber encompassed by six helically-twisted fibers (but with no free-floating temperature-detecting fiber). Although shape sensing by this configuration 712 may not be as robust as the first configuration 710 yet having a similar bulk/thickness, this second configuration 712 may be cheaper and easier to produce (because of the lack of a free-floating temperature-sensing fiber) and may still provide robust position, shape, bend and twist detection by measuring the stretch and compression of the seven single-core optical fibers 752. In this configuration, temperature influence can be compensated for algorithmically without need for being measured directly or extrapolated from these optical fibers 752.

A third configuration 720 ("4/7+T bundle") comprises four (4) optical fibers 762 and three (3) "dummy fibers" 764 (from which measurements are not obtained) in the arrangement shown, including one linearly-running central fiber encompassed by six helically-twisted fibers (alternating between single-core optical fibers and dummy fibers as shown), plus a free-floating temperature-detecting fiber 754. Although shape sensing by this third configuration 720 may not be as robust as the seven-fiber configurations 710 and 712, this third configuration 720 may still provide robust position, shape, bend and twist detection by measuring the stretch and compression of the four single-core optical fibers 762 and separately measure temperature without the effects of stretch and compression using the free-floating temperature-detecting fiber 754.

A fourth configuration 722 ("4/7 bundle") comprises the same arrangement of four (4) optical fibers and three (3) "dummy fibers" as the third configuration 720 but without a free-floating temperature-detecting fiber. Although shape sensing by this fourth configuration 722 may not be as robust as the third configuration 720, this fourth configuration 722 may be cheaper and easier to produce (because of the lack of a free-floating temperature-sensing fiber) and may still provide robust position, shape, bend and twist detection by measuring the stretch and compression of the four single-core optical fibers. In this configuration, temperature influence can be compensated for algorithmically without need for being measured directly or extrapolated from these fibers.

A fifth configuration 730 ("4/4+T bundle") comprises substantially the same arrangement as the third configuration 720 but without the dummy fibers 764 and still performs substantially the same the third configuration 720.

A sixth configuration 732 ("4/4 bundle") comprises substantially the same arrangement as the fourth configuration 722 but without the dummy fibers 764 (and still lacking the free-floating temperature-sensing fiber) and still performs substantially the same the fourth configuration 722.

A seventh configuration 740 ("3/3+T bundle") comprises three (3) helically-twisted single-core optical fibers 772 in the arrangement shown plus a free-floating temperature-detecting fiber 754. Relative to the previous six configurations shown in this FIG. 6, this seventh configuration 740 is least bulky, most flexible, and relatively inexpensive to produce but generally provides the least robust position, shape, bend and twist detection and is most computationally expensive because of the more limited data available (making more extrapolation of that data necessary).

An eighth configuration 742 ("3/3 bundle") comprises substantially the same arrangement as the seventh configuration 740 but without the free-floating temperature-sensing fiber), making it both least costly and least robust but, because of the helical twist of its single-core optical fibers, is still capable of position, shape, bend and twist detection albeit at a higher computational cost.

Figure 8:
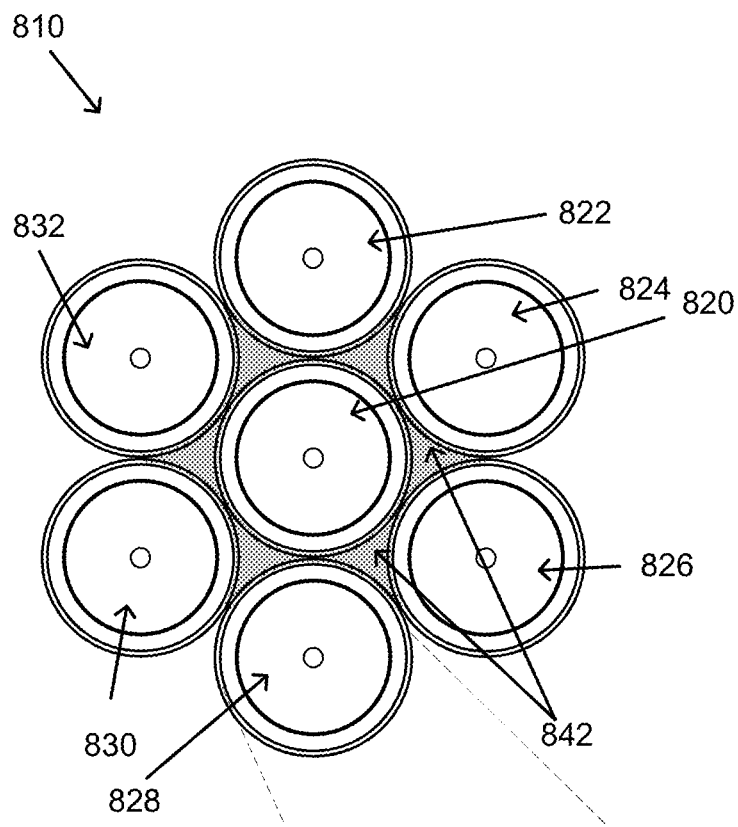
FIG. 8 illustrates a helically-twisted bundle of single-core optical fibers each comprising a second coating representative of various implementations disclosed herein.
Figure 8:
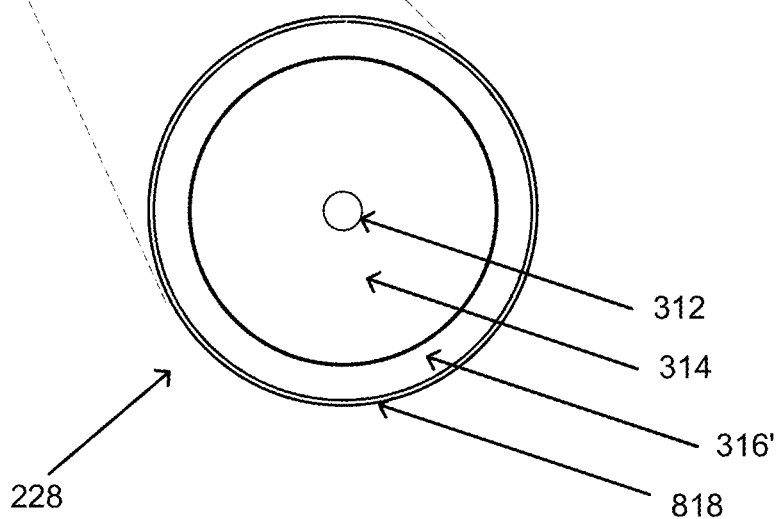

FIG. 8 illustrates a helically-twisted bundle 810 of single-core optical fibers 820, 822, 824, 826, 828, 830, and 832 each comprising a second coating 818 representative of various implementations disclosed herein. In FIG. 8, the single-core optical fibers 820, 822, 824, 826, 828, 830, and 832 each comprise a second coating 818 in addition to the first coating 316', cladding 314, and core 312. Furthermore, the single-core optical fibers 820, 822, 824, 826, 828, 830, and 832 are bound together by adhesive 842 which, for certain implementations, may bond especially well with the second coating 818 of the optical fibers in a manner that enhances shape sensing or for any other purpose.

Figure 9A:
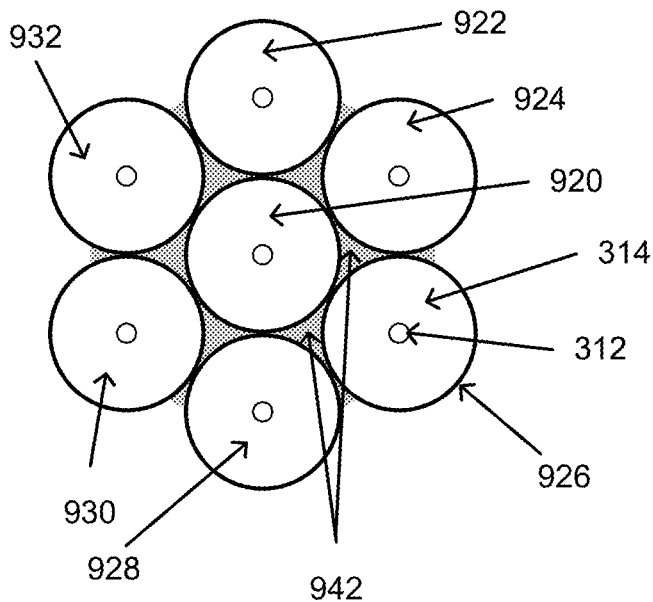
FIG. 9A illustrates a helically-twisted bundle of single-core optical fibers each lacking any coating representative of various implementations disclosed herein.

FIG. 9A illustrates a helically-twisted bundle 910 of single-core optical fibers 920, 922, 924, 926, 928, 930, and 932 each lacking any coating representative of various implementations disclosed herein. In FIG. 9A, each of the single-core optical fibers 920, 922, 924, 926, 928, 930, and 932 comprises a core 312 and cladding 314 but no coating such that fibers are disposed in cladding-to-cladding contact with each other (e.g., the linearly-running central fiber 920 is in contact with the other fibers 922, 924, 926, 928, 930, and 932) notwithstanding the adhesive 942 (if any) used to rigidly bind together the fibers. In any event, the coating-less single-core optical fibers 920, 922, 924, 926, 928, 930, and 932 may be bound together by adhesive 942 which, for certain implementations, may bond especially well with the cladding of the optical fibers in a manner that enhances shape sensing or for any other purpose.

Figure 9B:
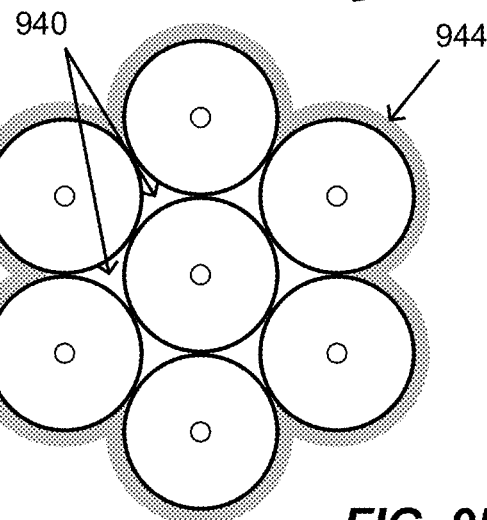
FIG. 9B illustrates a helically-twisted bundle of single-core optical fibers each lacking any coating and bound together by a form-fitting external covering representative of various implementations disclosed herein.

FIG. 9B illustrates a helically-twisted bundle 912 of single-core optical fibers 920, 922, 924, 926, 928, 930, and 932 each lacking any coating and bound together by a form-fitting external covering 944 representative of various implementations disclosed herein. In FIG. 9B, each of the single-core optical fibers 920, 922, 924, 926, 928, 930, and 932 comprises a core 312 and cladding 314 but no coating such that fibers are disposed in cladding-to-cladding contact with each other (e.g., the linearly-running central fiber 920 which is in contact with the other fibers 922, 924, 926, 928, 930, and 932), especially in the absence of any adhesive used to rigidly bind together the fibers in the spaces interior to the bundle 940 (as shown), although alternative implementations may utilize an adhesive 942 to fill in these interior spaces 940. Regardless, for these various implementations, the bundle 912 of coating-less single-core optical fibers 920, 922, 924, 926, 928, 930, and 932 may be bound together by a form-fitting external covering (or bundle-coating) 944 which, for certain implementations, may bond especially well with the out-facing cladding of the helically-twisted optical fibers in a manner that enhances shape sensing or for any other purpose. For several such implementations, the form-fitting external covering may comprise adhesive.

Figure 9C:
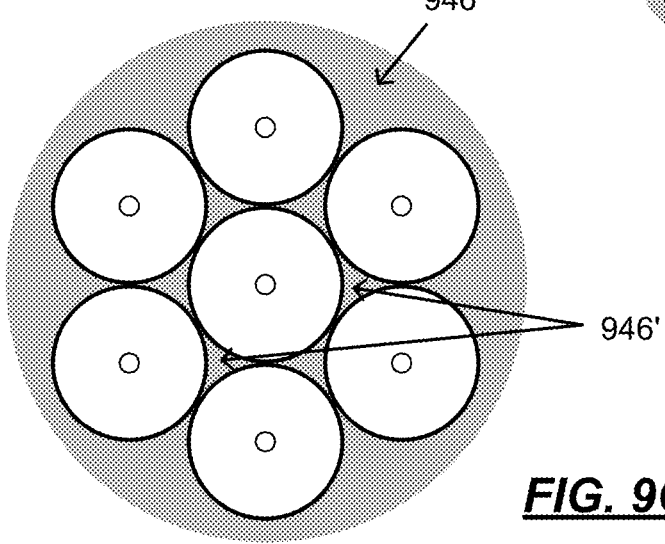
FIG. 9C illustrates a helically-twisted bundle of single-core optical fibers each lacking any coating and bound together by a smooth covering representative of various implementations disclosed herein.

FIG. 9C illustrates a helically-twisted bundle 914 of single-core optical fibers 920, 922, 924, 926, 928, 930, and 932 each lacking any coating and bound together by a smooth covering 946 representative of various implementations disclosed herein. In FIG. 9C, each of the single-core optical fibers 920, 922, 924, 926, 928, 930, and 932 comprises a core 312 and cladding 314 but no coating such that fibers are disposed in cladding-to-cladding contact with each other (e.g., the linearly-running central fiber 920 which is in contact with the other fibers 922, 924, 926, 928, 930, and 932), especially in the absence of any adhesive used to rigidly bind together the fibers in the spaces interior to the bundle 940 (as per FIG. 9B), but notwithstanding any adhesive 946 that might be used to form the external covering 946, including portions thereof 946' in the interior spaces 940 used to rigidly bind together the fibers. Various such implementations may utilize an adhesive 946 for these interior spaces 940 (shown as 946') as well as for the smooth coating 946 for the bundle 914. Regardless, for these various implementations, the bundle 914 of coating-less single-core optical fibers 920, 922, 924, 926, 928, 930, and 932 may be bound together by a smooth external covering (or bundle-coating) 946 and which, for certain implementations, may bond especially well with the cladding of the helically-twisted optical fibers in a manner that enhances shape sensing or for any other purpose.

In view of the foregoing, it is worth noting that one of the many benefits of the MFB approach (especially when compared to existing multicore fiber implementations) is that additional sensitivity that arises due to a coupling between two different types of deformation. Specifically, multicore fiber—while exhibiting different optical properties within the cross section—is homogeneous from a mechanical deformation point of view which leads it to behave more like a steel rod with regard to bend and twist detection. This distinction is important because deformations caused by bending, stretching, twisting, and thermal changes can be applied separately and independently, and none of these deformations necessarily depends on (or even affects) any other source or type of deformation. As such, in a multifiber bundle (with regard to the various implementations disclosed herein), there is coupling between twisting deformations and axial deformations such that a twist in one direction or the other causes the entire MFB to elongate or compress (depending on the direction of twist) which is in addition to the normal twist deformation that occurs. Stated differently, while twisting in a multicore fiber can only be detected as a shear strain deformation, twisting in a multifiber bundle causes axial elongation or compression in addition to the shear strain that are both detectable by an MFB.

As a result, the "shear strain" detectable by multicore fiber is on the order of 1-2 microstrain units whereas shear strain detectable by a multifiber bundle is on the order of 5-25 microstrain units. Furthermore, the axial strain in caused by the coupling effect in particular may be as high as 100-200 microstrain units. This larger strain detection for the same amount of twist makes twist detection easier and more accurate and a substantial improvement over MOF solutions.

In addition, another distinctive feature of MFB is the ability to tune the twist sensitivity by utilizing different rates of twist when manufacturing the helix structure, which is relatively simple to control and adds no cost. In contrast, multicore fiber manufacturers universally produce a helix having about 50 turns per meter, and changing this rate of twist for multicore fiber would be extremely expensive due to the lack of flexibility in drawing prototype fibers, or impossible because unintended optical side effects would occur (due to the cores of a multicore fiber exist within a single fiber). Furthermore, avoiding optical crosstalk in multicore fibers may be a major design consideration contributing to the standardized 50-turns-per-meter universally utilized in multicore fiber, whereas optical crosstalk is completely avoided by multifiber bundles and thus MFBs do not suffer from any such manufacturing limitations.

Computing Environment

Figure 10:
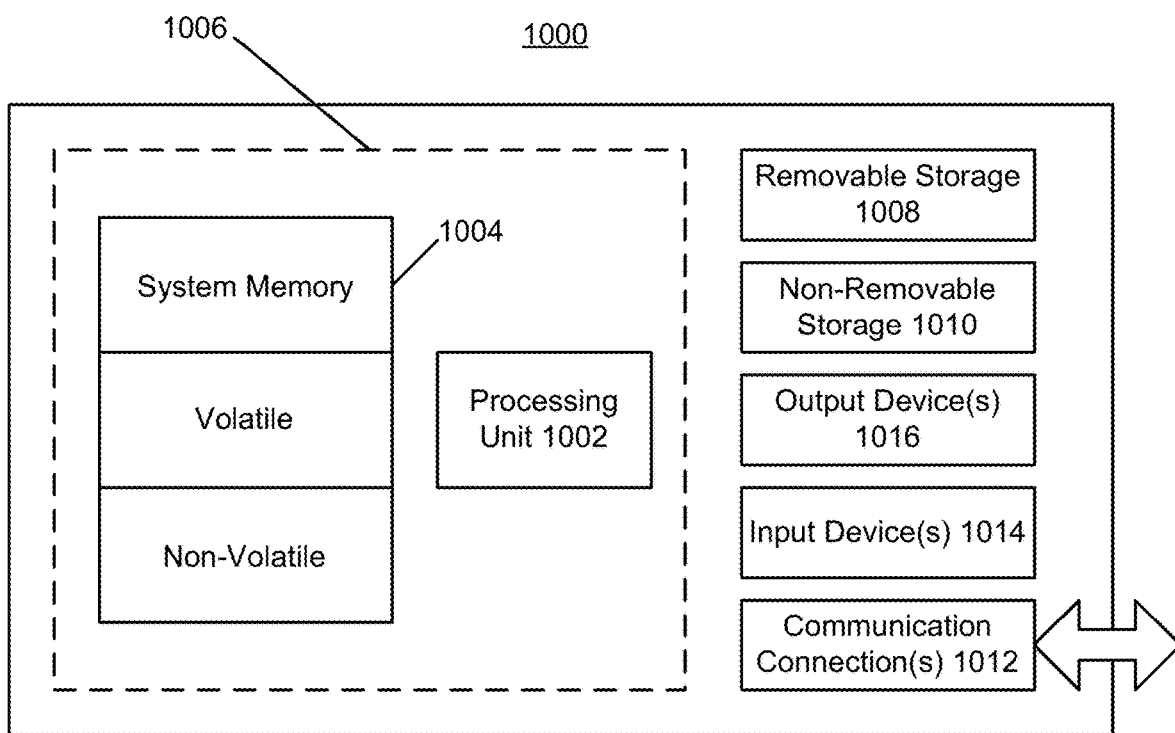
FIG. 10 is a block diagram of an example computing environment that may be used in conjunction with example implementations and aspects herein disclosed.

FIG. 10 is a block diagram of an example computing environment that may be used in conjunction with example implementations and aspects, such as the special-purpose computing system 140 operationally coupled to the interrogator 110 of FIG. 1. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, and so forth that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA), an analog-to-digital converter (ADC), or other programmable logic device, discrete gate or transistor logic, discrete hardware components, discrete data acquisition components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

With reference to FIG. 10, an exemplary system for implementing aspects described herein includes a computing device, such as computing device 1000. In a basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This basic configuration is illustrated in FIG. 10 by dashed line 1006 as may be referred to collectively as the "compute" component.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010. Computing device 1000 typically includes a variety of computer readable media. Computer readable media can be any available media that can be accessed by device 1000 and may include both volatile and non-volatile media, as well as both removable and non-removable media.

Computer storage media include volatile and non-volatile media, as well as removable and non-removable media, implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, and so forth. Output device(s) 1016 such as a display, speakers, printer, and so forth may also be included. All these devices are well-known in the art and need not be discussed at length herein. Computing device 1000 may be one of a plurality of computing devices 1000 inter-connected by a network. As may be appreciated, the network may be any appropriate network, each computing device 1000 may be connected thereto by way of communication connection(s) 1012 in any appropriate manner, and each computing device 1000 may communicate with one or more of the other computing devices 1000 in the network in any appropriate manner. For example, the network may be a wired or wireless network within an organization or home or the like, and may include a direct or indirect coupling to an external network such as the Internet or the like. Moreover, PCI, PCIe, and other bus protocols might be utilized for embedding the various implementations described herein into other computing systems.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Certain implementations described herein may utilize a cloud operating environment that supports delivering computing, processing, storage, data management, applications, and other functionality as an abstract service rather than as a standalone product of computer hardware, software, etc. Services may be provided by virtual servers that may be implemented as one or more processes on one or more computing devices. In some implementations, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database, etc.) of a device that is actually providing the service (e.g., computing, storage). Users may access cloud services via, for example, a web browser, a thin client, a mobile application, or in other ways. To the extent any physical components of hardware and software are herein described, equivalent functionality provided via a cloud operating environment is also anticipated and disclosed.

Additionally, a controller service may reside in the cloud and may rely on a server or service to perform processing and may rely on a data store or database to store data. While a single server, a single service, a single data store, and a single database may be utilized, multiple instances of servers, services, data stores, and databases may instead reside in the cloud and may, therefore, be used by the controller service. Likewise, various devices may access the controller service in the cloud, and such devices may include (but are not limited to) a computer, a tablet, a laptop computer, a desktop monitor, a television, a personal digital assistant, and a mobile device (e.g., cellular phone, satellite phone, etc.). It is possible that different users at different locations using different devices may access the controller service through different networks or interfaces. In one example, the controller service may be accessed by a mobile device. In another example, portions of controller service may reside on a mobile device. Regardless, controller service may perform actions including, for example, presenting content on a secondary display, presenting an application (e.g., browser) on a secondary display, presenting a cursor on a secondary display, presenting controls on a secondary display, and/or generating a control event in response to an interaction on the mobile device or other service. In specific implementations, the controller service may perform portions of methods described herein.

Anticipated Alternatives

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Moreover, it will be apparent to one skilled in the art that other embodiments may be practiced apart from the specific details disclosed above.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial implementation of the inventions are described or shown for the sake of clarity and understanding. Skilled artisans will further appreciate that block diagrams herein can represent conceptual views of illustrative circuitry embodying the principles of the technology, and that any flow charts, state transition diagrams, pseudo-code, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing computer program instructions in association with appropriate software. Persons of skill in this art will also appreciate that the development of an actual commercial implementation incorporating aspects of the inventions will require numerous implementation-specific decisions to achieve the developer's ultimate goal for the commercial implementation. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the implementations disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top,"

"bottom," "left," "right," "upper," "lower," "down," "up," "side," and the like, are used in the written description for clarity in specific reference to the drawings and are not intended to limit the scope of the invention or the appended claims. For particular implementations described with reference to block diagrams and/or operational illustrations of methods, it should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the implementations disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system. The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

The term "computer-readable instructions" as used above refers to any instructions that may be performed by the processor and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including wires of the bus. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

In the foregoing description, for purposes of explanation and non-limitation, specific details are set forth—such as particular nodes, functional entities, techniques, protocols, standards, etc.—in order to provide an understanding of the described technology. In other instances, detailed descriptions of well-known methods, devices, techniques, etc. are omitted so as not to obscure the description with unnecessary detail. All statements reciting principles, aspects, and embodiments, as well as specific examples, are intended to encompass both structural and functional equivalents, and such equivalents include both currently known equivalents as well as equivalents developed in the future, i.e., any elements developed that perform the same function, regardless of structure. While the disclosed implementations have been described with reference to one or more particular implementations, those skilled in the art will recognize that many changes may be made thereto. Therefore, each of the foregoing implementations and obvious variations thereof is contemplated as falling within the spirit and scope of the disclosed implementations, which are set forth in the claims presented below.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

What is claimed:

1. A device for sensing shape of a target body when fixedly coupled to said target body, the device comprising:
    a first optical fiber;
    a set of six additional optical fibers circumferentially encompassing the first optical fiber and helically twisted around said first optical fiber; and
    an adhesive for rigidly binding together the first optical fiber and the set of six additional optical fibers to form a multi-fiber bundle (MFB);
    wherein the first optical fiber and each optical fiber from among the set of six additional optical fibers comprise one core.

2. The device of claim 1, further comprising at least one Fiber Bragg Grating (FBG) disposed within each one core of each single-core optical fiber.

3. The device of claim 2, wherein the at least one FBG disposed within each one core comprises a single elongated FBG running the entire length of a shape-sensing region of the shape-sensing bundle.

4. The device of claim 2, wherein the FBGs are capable of being interrogated using Optical Frequency Domain Reflectometry (OFDR) or Optical Time Domain Reflectometry (OTDR).

5. The device of claim 2, wherein the at least one FBG disposed within each of one core of each single-core optical fiber overlaps at least one gap between FBGs in at least one other optical fiber from among the at least one optical fibers.

6. The device of claim 2, wherein the set of six additional optical fibers comprises a cladding surrounding each one core, and a coating surrounding each one cladding.

7. The device of claim 6, wherein the first optical fiber and each optical fiber from among the set of six additional optical fibers further comprise a second coating.

8. The device of claim 6, wherein the first optical fiber and each optical fiber from among the set of six additional optical fibers have the same diameter as measured from the outer surface of each coating through the optical fiber to the opposite side of each such coating.

9. A device for sensing shape of a target body when fixedly coupled to said target body, the device comprising:
    a first optical fiber;
    a set of six additional optical fibers circumferentially encompassing the first optical fiber and helically twisted around said first optical fiber; and
    an adhesive for rigidly binding together the first optical fiber and the set of six additional optical fibers to form a multi-fiber bundle (MFB);

wherein the first optical fiber and each optical fiber from among the set of six additional optical fibers comprise one core and a cladding surrounding each one core.

10. The device of claim 9, wherein the set of six additional optical fibers that comprises a cladding surrounding each one core further comprises a coating surrounding each one cladding.

11. The device of claim 10, wherein the first optical fiber and each optical fiber from among the set of six additional optical fibers further comprise a second coating.

12. The device of claim 9, wherein the adhesive is an adhesive epoxy.

13. The device of claim 12, further comprising at least one Fiber Bragg Grating (FBG) disposed within each one core of each single-core optical fiber, wherein the at least one FBG disposed within each one core comprises a single elongated FBG running the entire length of a shape-sensing region of the shape-sensing bundle, and wherein the at least one FBG disposed within each of one core of each single-core optical fiber overlaps at least one gap between FBGs in at least one other optical fiber from among the at least one optical fibers.

14. The device of claim 13, wherein the FBGs are capable of being interrogated using Optical Frequency Domain Reflectometry (OFDR) or Optical Time Domain Reflectometry (OTDR).

15. The device of claim 9, wherein the set of six additional optical fibers comprises have the same diameter as measured from the outer surface of each coating through the optical fiber to the opposite side of each such coating.

16. A device for sensing shape of a target body when fixedly coupled to said target body, the device comprising:

a first optical fiber;

a set of six additional optical fibers circumferentially encompassing the first optical fiber and helically twisted around said first optical fiber; and an adhesive for rigidly binding together the first optical fiber and the set of six additional optical fibers to form a multi-fiber bundle (MFB);

wherein the first optical fiber and each optical fiber from among the set of six additional optical fibers comprise one core, a cladding surrounding each one core, and a coating surrounding each one cladding.

17. The device of claim 16, further comprising at least one Fiber Bragg Grating (FBG) disposed within each one core of each single-core optical fiber, wherein the at least one FBG disposed within each one core comprises a single elongated FBG running the entire length of a shape-sensing region of the shape-sensing bundle.

18. The device of claim 17, wherein the at least one FBG disposed within each of one core of each single-core optical fiber overlaps at least one gap between FBGs in at least one other optical fiber from among the at least one optical fibers.

19. The device of claim 17, wherein the FBGs are capable of being interrogated using Optical Frequency Domain Reflectometry (OFDR) or Optical Time Domain Reflectometry (OTDR).

20. The device of claim 16, wherein the first optical fiber and each optical fiber from among the set of six additional optical fibers further comprise a second coating.

* * * * *